US012726513B2

(12) United States Patent
Zhuang et al.

(10) Patent No.: US 12,726,513 B2
(45) Date of Patent: Sep. 1, 2026

(54) METHOD AND APPARATUS FOR ROUTE VERIFICATION AND DATA SENDING, DEVICE, AND STORAGE MEDIUM

(71) Applicant: Huawei Technologies Co., Ltd., Shenzhen (CN)

(72) Inventors: Shunwan Zhuang, Beijing (CN); Haibo Wang, Beijing (CN); Yunan Gu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 274 days.

(21) Appl. No.: 18/471,700

(22) Filed: Sep. 21, 2023

(65) Prior Publication Data

US 2024/0022602 A1 Jan. 18, 2024

Related U.S. Application Data

(63) Continuation of application No. PCT/CN2022/082176, filed on Mar. 22, 2022.

(30) Foreign Application Priority Data

Mar. 25, 2021 (CN) ........................ 202110316535.X
Jun. 2, 2021 (CN) ........................ 202110614675.5

(51) Int. Cl.
*H04L 9/00* (2022.01)
*H04L 9/40* (2022.01)

(52) U.S. Cl.
CPC .......... *H04L 63/1466* (2013.01); *H04L 63/12* (2013.01); *H04L 63/1425* (2013.01); *H04L 2463/142* (2013.01)

(58) Field of Classification Search
CPC . H04L 63/1466; H04L 63/12; H04L 63/1425; H04L 2463/142; H04L 45/04; H04L 9/40; H04L 63/14; H04L 63/164
See application file for complete search history.

(56) References Cited

U.S. PATENT DOCUMENTS

2010/0153537 A1* 6/2010 Wang .................... H04L 63/14 709/224

FOREIGN PATENT DOCUMENTS

| | | | | |
|---|---|---|---|---|
| CN | 111147380 A | 5/2020 | | |
| CN | 111314285 A | 6/2020 | | |
| CN | 112398741 A | 2/2021 | | |
| EP | 4016941 A1 * | 6/2022 | ......... | H04L 63/0227 |

(Continued)

OTHER PUBLICATIONS

R. Bush et al., The Resource Public Key Infrastructure (RPKI) to Router Protocol, Version 2, draft-ietf-sidrops-8210bis-01, IETF, Feb. 4, 2021, total 31 pages.

(Continued)

*Primary Examiner* — Syed M Ahsan
(74) *Attorney, Agent, or Firm* — Conley Rose, P.C.

(57) ABSTRACT

A method includes a network device that obtains Border Gateway Protocol (BGP) route information, where the BGP route information includes a target route prefix; obtains, based on the target route prefix, a region identifier of a region to which the target route prefix actually belongs; and verifies the BGP route information based on the target route prefix and the region identifier of the region to which the target route prefix actually belongs.

20 Claims, 5 Drawing Sheets

(56) References Cited

FOREIGN PATENT DOCUMENTS

WO 2021027941 A1 2/2021

OTHER PUBLICATIONS

R. Bush et al., The Resource Public Key Infrastructure (RPKI) to Router Protocol, Version 2, draft-ietf-sidrops-8210bis-00, IETF, Mar. 30, 2020, total 31 pages.
R. Bush et al., The Resource Public Key Infrastructure (RPKI) to Router Protocol, IETF RFC 6810, Jan. 2013, total 27 pages.
P. Mohapatra et al., BGP Prefix Origin Validation State Extended Community, IETF RFC 8097, Mar. 2017, total 6 pages.

* cited by examiner

| Protocol Version | PDU Type (Protocol data unit type) | Zero | |
|---|---|---|---|
| Length | | | |
| Flags | Prefix Length (Prefix mask length) | Max Length (Maximum mask length) | Zero |
| IPv6 Prefix | | | |
| Autonomous System Number | | | |
| Region Identifier | | | |

METHOD AND APPARATUS FOR ROUTE VERIFICATION AND DATA SENDING, DEVICE, AND STORAGE MEDIUM

CROSS-REFERENCE TO RELATED APPLICATIONS

This application is a continuation application of International Patent Application No. PCT/CN2022/082176 filed on Mar. 22, 2022, which claims priority to Chinese Patent Application No. 202110614675.5 filed Jun. 2, 2021 and Chinese Patent Application No. 202110316535.X filed on Mar. 25, 2021. All of the aforementioned patent applications are hereby incorporated by reference in their entireties.

TECHNICAL FIELD

Embodiments of this application relate to the field of communication technologies, and in particular, to a method and an apparatus for route verification, a method and an apparatus for data sending, a device, and a storage medium.

BACKGROUND

In a network, security attacks based on a Border Gateway Protocol (BGP) route occur every day. For example, an external Internet service provider (ISP) may hijack user traffic through malicious attacks to eavesdrop on the user traffic.

To prevent user traffic from being eavesdropped, a mainstream solution in the industry is to introduce a resource public key infrastructure (RPKI) mechanism based on the BGP. Information required for verifying the BGP route is delivered to a network device such as a router or a switch by using the RPKI mechanism, and then validity verification is performed by comparing content carried in the BGP route information with information delivered by using the RPKI mechanism.

However, for some ISPs, an autonomous system (AS) of these ISPs and a plurality of route prefixes belonging to the AS may be distributed in a plurality of regions. For example, for an ISP, the ISP uses a same AS number globally but advertises different route prefixes in different regions. In this case, how to verify the BGP route information becomes an urgent problem to be resolved.

SUMMARY

Embodiments of this application provide a method and an apparatus for route verification, a method and an apparatus for data sending, a device, and a storage medium, to resolve a technical problem that user traffic is hijacked so that the user traffic is eavesdropped.

According to a first aspect, an embodiment of this application provides a route verification method. In the method, a first network device obtains BGP route information, where the BGP route information includes a target route prefix. The first network device obtains, based on the target route prefix, a region identifier of a region to which the target route prefix actually belongs, and the first network device verifies the BGP route information based on the target route prefix and the region identifier of the region to which the target route prefix actually belongs.

In embodiments of this application, when the BGP route information is verified, the region to which the route prefix belongs is considered. In this way, the BGP route information is verified by using the region identifier of the region to which the route prefix actually belongs, to improve accuracy of route source verification, so that network security is improved.

In some embodiments, a network further includes a second network device and a third network device. The second network device establishes an external BGP (EBGP) connection to the first network device, and the third network device establishes an internal BGP (IBGP) connection to the first network device. For the first network device, the second network device is an EBGP peer, and the third network device is an IBGP peer. The BGP route information obtained by the first network device is inbound BGP route information of the first network device, namely, route information received by the first network device from another network device, for example, route information received from the second network device, or the BGP route information is outbound BGP route information of the first network device, namely, route information to be sent by the first network device to another network device, for example, route information to be sent to the third network device. Optionally, the BGP route information may be from an inbound adjacent route information base (Adj-RIBs-In) or an outbound adjacent route information base (Adj-RIBs-Out) of the first network device.

For the outbound BGP route information, the BGP route information may be locally stored in the first network device after the first network device verifies the BGP routing information after receiving the BGP route information from the second network device. It is clear that, the BGP route information may alternatively be directly locally stored in the first network device after the first network device receives the BGP route information from the second network device without verifying the BGP routing information.

It should be noted that, the BGP route information may further include a target origin AS number in addition to the target route prefix. It is clear that, the BGP route information may further include other information. This is not limited in this embodiment of this application.

One ISP may provide one or more AS s, each AS has one AS number, and one AS may include a plurality of network devices. The network device may initiate advertisement of the BGP route information. An AS number of an AS in which a starting network device initiating the BGP route information is located may be referred to as an origin AS number of a route prefix included in the BGP route information.

Optionally, the route prefix is a prefix of a network address of the network device. For example, when the network device uses the Internet Protocol (IP) version 4 (IPv4) for communication, the route prefix is a prefix of an IPv4 address. When the network device uses the IP version 6 (IPv6) for communication, the route prefix is a prefix of an IPv6 address.

An implementation process in which the first network device obtains, based on the target route prefix, the region identifier of the region to which the target route prefix actually belongs includes the following. The first network device may determine a region identifier of a region to which a starting network device in a plurality of network devices through which the target route prefix actually passes belongs, to obtain the region identifier of the region to which the target route prefix actually belongs. In other words, the region identifier of the region to which the starting network device through which the target route prefix actually passes belongs is determined as the region identifier of the region to which the target route prefix actually belongs.

Because the starting network device in the plurality of network devices through which the target route prefix actually passes is a network device in a region to which the target route prefix actually belongs, the region identifier of the region to which the starting network device belongs may be determined as a region identifier of a region to which the target route prefix actually belongs.

It should be noted that the region identifier is for uniquely identifying a region, and the region identifier may be regional Internet registry (RIR) information, or clearly may be in another form, for example, one or a combination of the following information: local Internet registry (LIR) information, a continent, a region, a country, or a city.

Based on the foregoing descriptions, the route prefix is the prefix of the network address of the network device, one network address corresponds to one geographical address, and a geographical region in which the geographical address is located may be referred to as a region to which the route prefix belongs. In other words, the region to which the route prefix belongs is the geographical region in which the network device is located.

After obtaining the BGP route information, the first network device may verify the BGP route information, may further construct a route origin authorization (ROA) database before the verification, and may further process the BGP route information based on a verification result after the verification. Therefore, the following describes the several stages separately.

Stage of verifying the BGP route information:

In some embodiments, the first network device may determine a first entry from a stored ROA database, and verify the BGP route information based on the first entry and the region identifier of the region to which the target route prefix actually belongs.

Based on the foregoing descriptions, the BGP route information may include the target route prefix, or may include the target route prefix and the target origin AS number. The following describes the two cases.

In a first case, the BGP route information includes the target route prefix. In this way, the first network device may determine, from the stored ROA database, a first entry that matches the target route prefix, where the ROA database stores a correspondence between a route prefix and a region identifier. The first network device verifies the BGP route information based on the first entry and the region identifier of the region to which the target route prefix actually belongs.

In a second case, the BGP route information includes a target origin AS number and the target route prefix. In this way, the first network device may determine, from the stored ROA database, a first entry that matches the target origin AS number and the target route prefix, where the ROA database stores a correspondence among an origin AS number, a route prefix, and a region identifier. The first network device verifies the BGP route information based on the first entry and the region identifier of the region to which the target route prefix actually belongs. It is clear that, the first network device may first verify the target origin AS number, and when the verification of the target origin AS number succeeds, determine, from the stored ROA database, the first entry that matches the target origin AS number and the target route prefix, and then verify the BGP route information based on the first entry and the region identifier of the region to which the target route prefix actually belongs.

An implementation process in which the first network device verifies the target origin AS number includes the following. The first network device obtains, from the ROA database, an origin AS number corresponding to the target route prefix, and if the obtained origin AS number is the target origin AS number, determines that the verification of the target origin AS number succeeds, or if the obtained origin AS number is not the target origin AS number, determines that the verification of the target origin AS number fails.

An implementation process in which the first network device verifies the BGP route information based on the first entry and the region identifier of the region to which the target route prefix actually belongs includes the following. When a region identifier in the first entry is not empty, if the region identifier in the first entry is the same as or matches the region identifier of the region to which the target route prefix actually belongs, the first network device determines that the verification of the BGP route information succeeds. If the region identifier in the first entry is not the same as or does not match the region identifier of the region to which the target route prefix actually belongs, the first network device determines that the verification of the BGP route information fails. When a region identifier in the first entry is empty, the first network device determines that the region identifier in the first entry matches the region identifier of the region to which the target route prefix actually belongs, and determines that the verification of the BGP route information succeeds.

For some ASs, a route prefix of the AS may be applicable globally, or may be applicable to only a local region. In other words, the route prefix of the AS may be applicable to any region, or may be applicable to only a local region. When the route prefix of the AS is applicable to any region, a region identifier in a corresponding entry in the ROA database may be empty, or when the route prefix of the AS is applicable to any region, the region identifier in the corresponding entry in the ROA database may be not empty. This is, the region identifier in the corresponding entry in the ROA database may be empty or not empty.

Therefore, after the first entry is obtained through matching by using the target origin AS number and the target route prefix, when the region identifier in the first entry is not empty, it indicates that the route prefix of the AS is applicable to a local region. In this case, the region identifier in the first entry needs to be compared with the region identifier of the region to which the target route prefix actually belongs, to determine whether validity verification of the region to which the target route prefix belongs succeeds. When the region identifier in the first entry is empty, it indicates that the route prefix of the AS is applicable to any region. In this case, the first network device may directly determine that the region identifier in the first entry matches the region identifier of the region to which the target route prefix actually belongs, and determine that the verification of the BGP route information succeeds.

It is clear that, when the route prefix of the AS is applicable globally, the region identifier in the corresponding entry in the ROA database may alternatively be represented by using another identifier, for example, represented by using a specific identifier. In this case, when the route prefix of the AS is applicable to any region, the region identifier in the corresponding entry in the ROA database is not empty. In this way, after the first entry is obtained through matching by using the target origin AS number and the target route prefix, the first network device needs to determine whether the region identifier in the first entry is a specific identifier. If the region identifier in the first entry is not a specific identifier, it indicates that the route prefix of the AS is applicable to a local region. In this case, the region identifier in the first entry needs to be compared with the region identifier of the region to which the target route prefix actually belongs, to determine whether validity verification of the region to which the target route prefix belongs succeeds. If the region identifier in the first entry is a specific identifier, it indicates that the route prefix of the AS is applicable to any region. In this case, the first network device may directly determine that the region identifier in the first entry matches the region identifier of the region to which the target route prefix actually belongs, and determine that the verification of the BGP route information succeeds.

It should be noted that, that the route prefix is applicable to any region means that the route prefix may be used in any region, and that the route prefix is applicable to a local region means that the route prefix may be used in a local region.

Stage of building an ROA database:

Optionally, before the first network device determines, from the stored ROA database, the first entry that matches the target origin AS number and the target route prefix, an ROA database may further be built. The ROA database includes one or more entries, and each entry stores a correspondence between a route prefix and a region identifier. Alternatively, the ROA database stores a correspondence among an origin AS number, a route prefix, and a region identifier. The following also describes the two cases.

In a first case, by using the first entry as an example, an implementation process in which the first network device builds the ROA database includes the following. The first network device obtains the target route prefix and target region indication information from a server, where the target region indication information includes a region identifier or indication information indicating that the target route prefix is applicable to any region. The first network device creates the first entry in the ROA database based on the target route prefix and the target region indication information.

After obtaining the target route prefix and the target region indication information, the server sends the target route prefix and the target region indication information to the first network device. The first network device creates the first entry in the ROA database based on the target route prefix and the target region indication information.

The first network device may obtain the target route prefix and the target region indication information from the server in two implementations. In other words, the server may send the target route prefix and the target region indication information to the first network device in two implementations. The following describes the two implementations.

In a first implementation, the server sends a packet to the first network device, where the packet carries the target route prefix and the target region indication information. The first network device receives the packet from the server. In the first implementation, the server sends the target route prefix and the target region indication information to the first network device by using the packet. In this way, after receiving the packet, the first network device may directly store the target route prefix and the target region indication information in the ROA database.

In a second implementation, the server sends a packet to the first network device, where the packet carries the target route prefix. The first network device receives the packet from the server. The first network device sends a request message to the server, where the request message carries the target route prefix, and the request message requests to obtain region indication information corresponding to the target route prefix. After receiving the request message sent by the first network device, the server obtains, based on the target route prefix, the target region indication information from a stored correspondence between a route prefix and region indication information. The server sends the target region indication information to the first network device. The first network device receives the target region indication information sent by the server.

In a second case, by using the first entry as an example, an implementation process in which the first network device builds the ROA database includes the following. The first network device obtains the target origin AS number, the target route prefix, and target region indication information from a server, where the target region indication information includes a region identifier or indication information indicating that the target route prefix is applicable to any region. The first network device creates the first entry in the ROA database based on the target origin AS number, the target route prefix, and the target region indication information.

After obtaining the target origin AS number, the target route prefix, and the target region indication information, the server sends the target origin AS number, the target route prefix, and the target region indication information to the first network device. The first network device creates the first entry in the ROA database based on the target origin AS number, the target route prefix, and the target region indication information.

The first network device may obtain the target origin AS number, the target route prefix, and the target region indication information from the server in two implementations. In other words, the server may send the target origin AS number, the target route prefix, and the target region indication information to the first network device in two implementations. The following describes the two implementations.

In a first implementation, the server sends a packet to the first network device, where the packet carries the target origin AS number, the target route prefix, and the target region indication information. The first network device receives the packet from the server. In the first implementation, the server sends the target origin AS number, the target route prefix, and the target region indication information to the first network device by using the packet. In this way, after receiving the packet, the first network device may directly store the target origin AS number, the target route prefix, and the target region indication information in the ROA database.

In a second implementation, the server sends a packet to the first network device, where the packet carries the target origin AS number and the target route prefix. The first network device receives the packet from the server. The first network device sends a request message to the server, where the request message carries the target route prefix, and the request message requests to obtain region indication information corresponding to the target route prefix. After receiving the request message sent by the first network device, the server obtains, based on the target route prefix, the target region indication information from a stored correspondence between a route prefix and region indication information. The server sends the target region indication information to the first network device. The first network device receives the target region indication information sent by the server. In the second implementation, an existing packet format does not need to be modified, and the target origin AS number and the target route prefix are carried in a same packet in the existing packet format. In this way, after receiving the packet, the first network device may obtain the target region indication information from the server based on the target route prefix, to store the target origin AS number, the target route prefix, and the target region indication information in the ROA database.

Stage of processing the BGP route information:

Based on the foregoing descriptions, the BGP route information obtained by the first network device may be inbound BGP route information, or may be outbound BGP route information. When directions of the BGP route information are different, the BGP route information is processed in different manners based on verification results of the BGP routing information. The following provides descriptions based on different cases.

In a first case, the BGP route information is inbound BGP route information.

The BGP route information is BGP route information from a second network device. In other words, the BGP route information is route information from an external BGP peer, and the BGP route information corresponds to a first BGP route. In this way, the first network device may store the first BGP route when the verification of the BGP route information succeeds. When the verification of the BGP route information fails, the first network device discards the first BGP route, or when the verification of the BGP route information fails, the first network device sets a priority of the first BGP route to a low priority. For example, a priority of the first BGP route is set to a first priority, where the first priority is lower than a second priority, the second priority is a priority of a second BGP route, and a prefix of the second BGP route is the same as a prefix of the first BGP route. Optionally, a region to which the route prefix corresponding to the second BGP route belongs is the same as a region to which the second network device belongs.

Optionally, when the verification of the BGP route information fails, it indicates that the BGP route information may be hijacked route information. In other words, the BGP route information may be forged route information, and security is low. However, the second network device is an external BGP peer of the first network device, and the region to which the route prefix corresponding to the second BGP route belongs is the same as the region to which the second network device belongs, that is, the second BGP route is a route advertised by the second network device. Therefore, the priority of the first BGP route may be set to be lower than the priority of the second BGP route. In this way, in a process of delivering the BGP route to a forwarding table, the second BGP route with the higher priority may be selected and delivered to the forwarding table, so that user traffic is prevented from being eavesdropped on the premise that the user traffic can be forwarded under guidance.

It is clear that, when the verification of the BGP route information fails, the first BGP route included in the BGP route information is directly discarded. In this way, the first BGP route can be prohibited from being used on a network device, and the user traffic can also be prevented from being eavesdropped.

In a second case, the BGP route information is outbound BGP route information.

The BGP route information is BGP route information sent to a third network device. In other words, the BGP route information is route information sent to an internal BGP peer, and the BGP route information corresponds to a first BGP route. In this way, when the verification of the BGP route information succeeds, the first network device sends the BGP route information to the third network device, so that the third network device stores the first BGP route, and further forwards the packet by using the first BGP route.

Based on the foregoing descriptions, when receiving the inbound BGP route information, the first network device may not verify the BGP route information, but store the BGP route information. In other words, after verifying the inbound BGP route information, the first network device stores the BGP route information. That is, route information locally stored in the first network device may be verified, or may not be verified. Regardless of whether the route information locally stored in the first network device is verified, when it is determined that the verification of the BGP route information succeeds before the BGP route information is sent to the third network device, the BGP route information may be directly sent to the third network device.

However, when it is currently determined that the verification of the BGP route information fails, two cases need to be described separately. When the verification of the route information locally stored in the first network device succeeds, and before the BGP route information is sent to the third network device, if it is determined that the verification of the BGP route information fails, the first network device may determine, from the stored ROA database, a second entry that matches the target route prefix and the region identifier of the region to which the target route prefix actually belongs. The first network device modifies an origin AS number in the BGP route information to an origin AS number in the second entry. When the route information locally stored in the first network device is not verified, and before the BGP route information is sent to the third network device, if it is determined that the verification of the BGP route information fails, the first network device may discard the first BGP route included in the BGP route information, or set the priority of the first BGP route included in the BGP route information to the first priority.

It should be noted that, after the first network device locally stores the BGP route information, the origin AS number in the locally stored BGP route information may be incorrectly modified due to a routing policy or a software problem. Therefore, when the verification of the BGP route information fails, if the BGP route information is not verified before being locally stored in the first network device, it indicates that the origin AS number included in the BGP route information may be incorrectly modified due to the routing policy or the software problem of the first network device, or the BGP route information may be forged route information originally. For security, the first BGP route included in the BGP route information may be discarded, or the priority of the first BGP route included in the BGP route information may be set to a low priority.

However, if the BGP route information is verified before being locally stored in the first network device, and the verification succeeds, it indicates that the origin AS number included in the BGP route information is indeed incorrectly modified due to the routing policy or the software problem of the first network device. Therefore, the first network device may determine, from the stored ROA database, the second entry that matches the target route prefix and the region identifier of the region to which the target route prefix actually belongs, and further modify the origin AS number in the BGP route information to an origin AS number in the second entry. In this way, a problem of invalid BGP route information caused by incorrect modification of the origin AS number due to the routing policy or the software problem, and a problem of an Internet fault is avoided.

According to a second aspect, a data sending method is provided. In this method, a server obtains a target route prefix and target region indication information, where target region indication information includes a region identifier or indication information indicating that the target route prefix is applicable to any region, and the server sends the target route prefix and the target region indication information to a first network device, where the first network device is any network device in a network based on a BGP.

Optionally, that the server sends the target route prefix and the target region indication information to a first network device includes the following. The server sends a packet to the first network device, where the packet carries the target route prefix and the target region indication information.

Optionally, that the server sends the target route prefix and the target region indication information to a first network device includes the following. The server sends a packet to the first network device, where the packet carries the target route prefix, the server receives a request message sent by the first network device, where the request message carries the target route prefix, the server obtains, based on the target route prefix, the target region indication information from a stored correspondence between a route prefix and region indication information, and the server sends the target region indication information to the first network device.

Optionally, the method further includes the following. The server obtains the target origin AS number, and that the server sends the target route prefix and the target region indication information to the first network device includes the following. The server sends the target origin AS number, the target route prefix, and the target region indication information to the first network device.

Optionally, that the server sends the target origin AS number, the target route prefix, and the target region indication information to the first network device includes the following. The server sends a packet to the first network device, where the packet carries the target origin AS number, the target route prefix, and the target region indication information.

Optionally, that the server sends the target origin AS number, the target route prefix, and the target region indication information to a first network device includes the following. The server sends a packet to the first network device, where the packet carries the target origin AS number and the target route prefix, the server receives a request message sent by the first network device, where the request message carries the target route prefix, the server obtains, based on the target route prefix, the target region indication information from a stored correspondence between a route prefix and region indication information, and the server sends the target region indication information to the first network device.

Optionally, the server is an RPKI server.

According to a third aspect, a route verification apparatus is provided. The route verification apparatus has a function of implementing behavior of the route verification method in the first aspect or the possible implementations of the first aspect. The route verification apparatus includes at least one module, and the at least one module is configured to implement the route verification method provided in the first aspect.

According to a fourth aspect, a data sending apparatus is provided. The data sending apparatus has a function of implementing behavior of the data sending method in the second aspect or the possible implementations of the second aspect. The data sending apparatus includes at least one module, and the at least one module is configured to implement the data sending method provided in the second aspect.

According to a fifth aspect, a network device is provided. The network device includes a processor and a memory. The memory is configured to store a program, instructions, or code for performing the route verification method provided in the first aspect, and store data for implementing the route verification method provided in the first aspect. The processor is configured to execute the program, instructions, or code stored in the memory.

Optionally, the network device may further include a communication bus, and the communication bus is configured to establish a connection between the processor and the memory.

According to a sixth aspect, a server is provided. The server includes a processor and a memory. The memory is configured to store a program, instructions, or code for performing the data sending method provided in the second aspect, and store data for implementing the data sending method provided in the second aspect. The processor is configured to execute the program, instructions, or code stored in the memory.

Optionally, the network device may further include a communication bus, and the communication bus is configured to establish a connection between the processor and the memory.

According to a seventh aspect, a computer-readable storage medium is provided. The storage medium stores instructions, and when the instructions are run on a computer, the computer is enabled to perform the steps of the route verification method according to the first aspect, or perform the steps of the data sending method according to the second aspect.

According to an eighth aspect, a computer program product including instructions is provided. When the instructions are run on a computer, the computer is enabled to perform the steps of the route verification method according to the first aspect, or perform the steps of the data sending method according to the second aspect.

In other words, a computer program is provided, and when the computer program runs on a computer, the computer is enabled to perform the steps of the route verification method according to the first aspect, or perform the steps of the data sending method according to the second aspect.

Technical effects achieved in the second aspect, the third aspect, the fourth aspect, the fifth aspect, the sixth aspect, the seventh aspect, and the eighth aspect are similar to technical effects achieved by using corresponding technical means in the first aspect, and details are not described herein again.

The technical solutions provided in embodiments of this application may bring at least the following beneficial effects.

In embodiments of this application, when the BGP route information is verified, the region to which the route prefix belongs is considered. In this way, the BGP route information is verified by using the region identifier of the region to which the route prefix actually belongs, to improve accuracy of route source verification, so that network security is improved.

DESCRIPTION OF EMBODIMENTS

To make objectives, technical solutions, and advantages of embodiments of this application clearer, the following further describes implementations of this application in detail with reference to the accompanying drawings.

Figure 1:
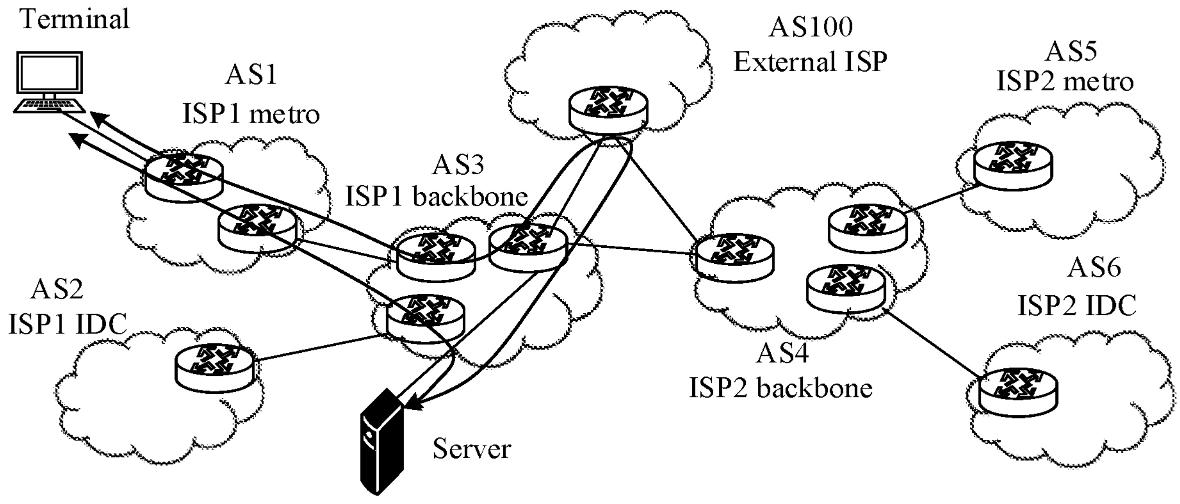
FIG. 1 is a schematic diagram of an example scenario according to an embodiment of this application.

The Internet is a large network in which networks are connected by using a group of common protocols. It depends on infrastructures to ensure network connectivity, service availability, and service reliability. The Internet infrastructures mainly include an inter-domain routing system, a Domain Name System (DNS), and a public key certificate system (PKI). However, because the current infrastructures lack a solid and secure trusted foundation, and the BGP and the DNS do not consider any factor of security and trustworthiness at the beginning of design, a security capability is naturally low. Therefore, in the current situation, BGP route-based security attacks occur every day, such as source hijacking, path hijacking, and route leakage. For example, in a network scenario shown in FIG. 1, a server accesses an ISP1 backbone network. When a user accesses the server through a terminal, user traffic passes through an ISP1 metro network in AS1 and the ISP1 backbone network in AS3 to reach the server. However, if an external ISP in AS100 initiates a malicious attack, the user traffic is hijacked to the external ISP and then sent to the ISP1 backbone network. In this case, the user traffic is eavesdropped. Therefore, the problem of Internet security is to be urgently resolved.

To prevent the user traffic from being eavesdropped, a mainstream solution in the industry is to introduce an RPKI mechanism based on the BGP. Information required for verifying a BGP route is delivered to a network device such as a router or a switch by using the RPKI mechanism, and then validity verification is performed by comparing content carried in BGP route information with information delivered by using the RPKI mechanism. In other words, the RPKI mechanism is introduced in a BGP route learning stage, and the RPKI mechanism is used to verify a validity of an origin of a BGP route to be learned. Then, when delivering BGP routes to a forwarding table, a BGP route that passes the validity verification is selected and delivered to the forwarding table, to guide user traffic forwarding and prevent the user traffic from being eavesdropped.

The RPKI mechanism mainly collects information, such as an origin AS number and a route prefix, in BGP route information initiated by ISPs by using an RPKI server. In addition, when advertising the BGP route information, each ISP also needs to carry the origin AS number and the route prefix in the BGP routing information. The network device establishes a connection with the RPM server and stores an ROA database locally. The ROA database stores a correspondence between the origin AS number and the route prefix obtained from the RPKI server. When the network device receives BGP route information advertised by an external peer, the network device matches an origin AS number and a route prefix carried in the BGP route information with an entry in the ROA database to verify whether the BGP route information received from the external peer is valid, ensuring that hosts in a management domain of the network device can securely access external services.

However, for some ISPs, an AS of these ISPs and a plurality of route prefixes belonging to the AS may be distributed in a plurality of regions. For example, for an ISP, the ISP uses a same AS number globally but advertises different route prefixes in different regions. In this case, the network device cannot recognize a region to which the route prefix included in the BGP route information belongs. Therefore, in the foregoing verification manner, whether the BGP route information received from the external peer is valid cannot be verified, and this attack manner cannot be prevented.

In the method provided in embodiments of this application, a concept of region belonging information is introduced, that is, a region identifier of a region to which a route prefix belongs is introduced. In this way, when a plurality of route prefixes of one AS are distributed in a plurality of different regions, the region to which the route prefix included in the BGP route information belongs is distinguished by using a region identifier of the region to which the route prefix belongs, to verify whether the BGP route information received from the external peer is valid, and improve network security.

Figure 2:
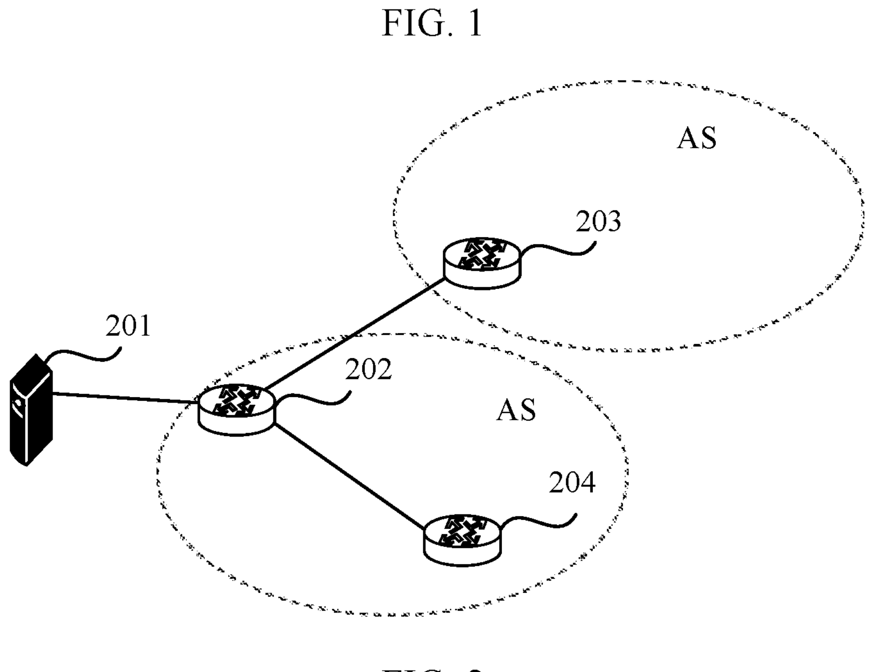
FIG. 2 is a schematic diagram of an implementation scenario according to an embodiment of this application.

FIG. 2 is a schematic diagram of an example implementation scenario according to an embodiment of this application. The implementation scenario includes a server 201, a first network device 202, a second network device 203, and a third network device 204. The first network device 202 and the second network device 203 belong to different ASs, and the first network device 202 and the third network device 204 belong to a same AS. In other words, for the first network device 202, the second network device 203 is an EBGP peer, and the third network device 204 is an IBGP peer.

Figure 3:
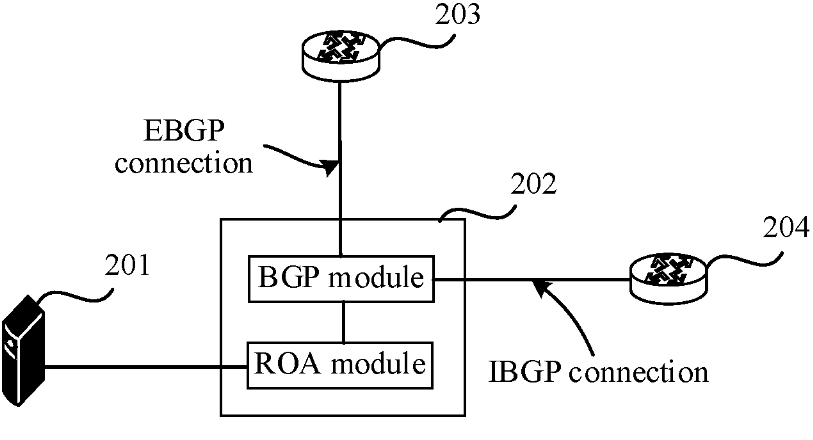
FIG. 3 is a schematic diagram of another implementation scenario according to an embodiment of this application.

The server 201 communicates with the first network device 202 in a wired or wireless manner. The first network device 202 communicates with the second network device 203 by using the BGP. The first network device 202 communicates with the third network device 204 also by using the BGP. As shown in FIG. 3, the first network device 202 includes a BGP module, the first network device 202 may establish an EBGP connection to the second network device 203 by using the BGP module, and the first network device 202 may establish an IBGP connection to the third network device 204 by using the BGP module.

The server 201 is configured to collect information, such as a route prefix and a region identifier, in BGP route information initiated by each ISP, and deliver the information to the first network device 202. Optionally, the server 201 is further configured to collect an origin AS number in the BGP route information initiated by each ISP, and deliver the collected origin AS number to the first network device 202.

The first network device 202 locally builds a ROA database based on the received information. The ROA database includes one or more entries, and each entry stores a correspondence between a route prefix and a region identifier. Alternatively, the ROA database stores a correspondence among an origin AS number, a route prefix, and a region identifier. Optionally, as shown in FIG. 3, the first network device 202 further includes an ROA module, and the first network device 202 may locally build the ROA database by using the ROA module.

When the first network device 202 receives BGP route information sent by the second network device 203, the first network device 202 may verify, based on the BGP route information and the ROA database, whether the BGP route information is valid. This process is referred to as inbound BGP route verification. Optionally, when the first network device 202 determines that the verification of the BGP route information succeeds, the first network device 202 may store the BGP route information.

It should be noted that, after the verification by the first network device 202 on the BGP route information from the second network device 203 succeeds, the first network device 202 may locally store the BGP routing information. However, when the BGP route information includes an origin AS number, the first network device 202 may incorrectly modify the origin AS number in the locally stored BGP route information due to a routing policy or a software problem. Therefore, before sending the BGP route information to the third network device 204, the first network device 202 may further verify the BGP route information again. This process is referred to as outbound BGP route verification. In other words, the first network device 202 not only performs inbound verification on the BGP route information from the second network device 203, but may also perform outbound verification on the BGP routing information.

Optionally, when receiving the BGP route information sent by the second network device 203, the first network device 202 may not verify whether the BGP route information is valid, but store the BGP route information. Then, before sending the BGP route information to the third network device 204, the first network device 202 may verify, based on the BGP route information and the ROA database, whether the BGP route information is valid. In other words, the first network device 202 does not perform inbound verification on the BGP route information from the second network device 203, but performs outbound verification on the BGP routing information.

Generally, the first network device 202 not only needs to verify the BGP route information and learn a BGP route, but also needs to forward a packet. Therefore, each time the first network device 202 receives one piece of BGP route information, if the first network device 202 performs validity verification on the BGP route information, pressure of the first network device 202 may be high. Therefore, in some cases, the validity verification process on the BGP route information may be deployed on a verification device such as a controller, a network management device, or a centralized analysis device.

In these cases, when the first network device 202 receives one piece of BGP route information, the first network device 202 sends the BGP route information to the verification device, and the verification device performs validity verification on the BGP route information. Then, the verification device delivers a verification result of the BGP route information to the first network device 202. A process in which the verification device verifies the BGP route information is similar to a process in which the first network device 202 verifies the BGP route information. In addition, after the verification device delivers the verification result of the BGP route information to the first network device 202, a manner in which the first network device 202 processes the BGP route information based on the verification result is similar to a manner in which the first network device 202 verifies the BGP route information and further processes the BGP route information based on a verification result. The following describes in detail the manner in which the first network device 202 verifies the BGP route information and the manner in which the first network device 202 processes the BGP route information based on the verification result. For the process in which the verification device verifies the BGP route information, refer to the process in which the first network device 202 verifies the BGP route information. For a detailed process, refer to the descriptions in the following embodiments.

Figure 4:
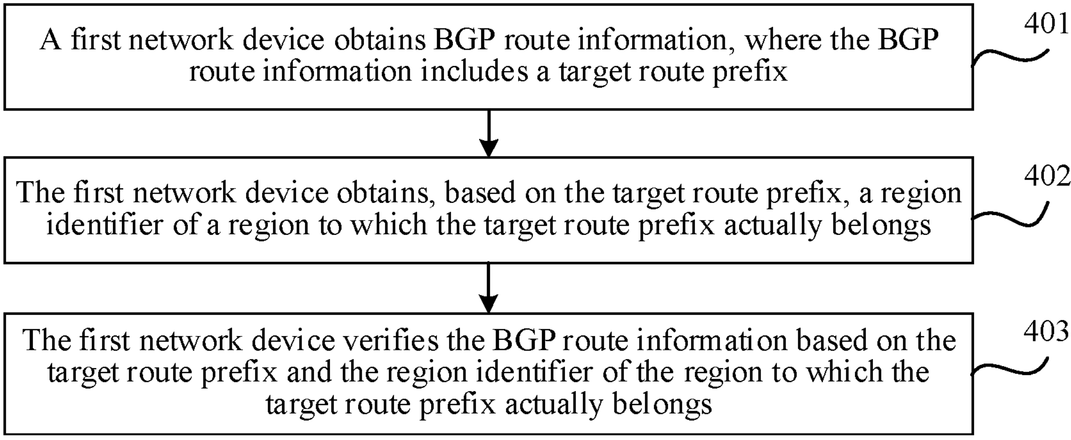
FIG. 4 is a flowchart of a route verification method according to an embodiment of this application.

FIG. 4 is a flowchart of a route verification method according to an embodiment of this application. The method is applied to a first network device in a BGP-based network. The first network device may be the first network device 202 shown in FIG. 2 or FIG. 3. Refer to FIG. 4. The method includes the following steps.

Step 401: The first network device obtains BGP route information, where the BGP route information includes a target route prefix.

Based on the foregoing descriptions, the BGP network further includes a second network device and a third network device, the second network device establishes an EBGP connection to the first network device, and the third network device establishes an IBGP connection to the first network device. For the first network device, the second network device is an external BGP peer, and the third network device is an internal BGP peer.

The BGP route information obtained by the first network device is inbound BGP route information of the first network device, namely, route information received by the first network device from another network device, for example, route information received from the second network device, or the BGP route information is outbound BGP route information of the first network device, namely, route information to be sent by the first network device to another network device, for example, route information to be sent to the third network device. Optionally, the BGP route information may be from an Adj-RIBs-In or an Adj-RIBs-Out of the first network device.

For the outbound BGP route information, the BGP route information may be locally stored in the first network device after the first network device verifies the BGP routing information after receiving the BGP route information from the second network device. It is clear that, the BGP route information may alternatively be directly locally stored in the first network device after the first network device receives the BGP route information from the second network device without verifying the BGP routing information.

It should be noted that, the BGP route information may further include a target origin AS number in addition to the target route prefix. It is clear that, the BGP route information may further include other information. This is not limited in this embodiment of this application.

One ISP may provide one or more ASs, each AS has one AS number, and one AS may include a plurality of network devices. The network device may initiate advertisement of the BGP route information. An AS number of an AS in which a starting network device initiating the BGP route information is located may be referred to as an origin AS number of a route prefix included in the BGP route information, that is, the starting network device initiating the BGP route information is located in an AS identified by the origin AS number.

Optionally, the route prefix is a prefix of a network address of the network device. For example, when the network device uses the IPv4 for communication, the route prefix is a prefix of an IPv4 address. When the network device uses the IPv6 for communication, the route prefix is a prefix of an IPv6 address.

Step 402: The first network device obtains, based on the target route prefix, a region identifier of a region to which the target route prefix actually belongs.

In some embodiments, the first network device may determine a region identifier of a region to which a starting network device in a plurality of network devices through which the target route prefix actually passes belongs, to obtain the region identifier of the region to which the target route prefix actually belongs. In other words, the region identifier of the region to which the starting network device through which the target route prefix actually passes belongs is determined as the region identifier of the region to which the target route prefix actually belongs.

In an example, the first network device may detect all network devices that the target route prefix actually passes through, to obtain a plurality of network devices. The first network device determines a region identifier of a region to which a starting network device in the plurality of network devices belongs, to obtain the region identifier of the region to which the target route prefix actually belongs. For example, the first network device obtains, through a command-line tool such as traceroute on the target route prefix and detection on a region of all nodes through which the target route prefix actually passes, a region in which the route prefix is actually located currently.

The first network device may determine, in a reverse detection manner based on the target route prefix and the target origin AS number, all network devices through which the target route prefix actually passes. There are a plurality of specific detection methods, which are not limited in this embodiment of this application.

Because the starting network device in the plurality of network devices through which the target route prefix actually passes is a network device in a region to which the target route prefix actually belongs, the region identifier of the region to which the starting network device belongs may be determined as a region identifier of a region to which the target route prefix actually belongs.

It should be noted that the region identifier is for uniquely identifying a region, and the region identifier may be regional Internet registry (RIR) information, or may be in another form, for example, one or a combination of the following information such as local Internet registry (LIR) information, a continent, a region, a country, or a city.

Based on the foregoing descriptions, the route prefix is the prefix of the network address of the network device, one network address corresponds to one geographical address, and a geographical region in which the geographical address is located may be referred to as a region to which the route prefix belongs. In other words, the region to which the route prefix belongs is the geographical region in which the network device is located.

Step 403: The first network device verifies the BGP route information based on the target route prefix and the region identifier of the region to which the target route prefix actually belongs.

After obtaining the BGP route information, the first network device may verify the BGP route information, may further construct an ROA database before the verification, and may further process the BGP route information based on a verification result after the verification. Therefore, the following describes the several stages separately.

Stage of verifying the BGP route information:

In some embodiments, the first network device may determine a first entry from a stored ROA database, and verify the BGP route information based on the first entry and the region identifier of the region to which the target route prefix actually belongs.

Based on the foregoing descriptions, the BGP route information may include the target route prefix, or may include the target route prefix and the origin AS number. The following describes the two cases.

In a first case, the BGP route information includes the target route prefix. In this way, the first network device may determine, from the stored ROA database, a first entry that matches the target route prefix, where the ROA database stores a correspondence between a route prefix and a region identifier. The first network device verifies the BGP route information based on the first entry and the region identifier of the region to which the target route prefix actually belongs.

In a second case, the BGP route information includes a target origin AS number and the target route prefix. In this way, the first network device may determine, from the stored ROA database, a first entry that matches the target origin AS number and the target route prefix, where the ROA database stores a correspondence among an origin AS number, a route prefix, and a region identifier. The first network device verifies the BGP route information based on the first entry and the region identifier of the region to which the target route prefix actually belongs.

It is clear that, in the second case, the first network device may first verify the target origin AS number, and when the verification of the target origin AS number succeeds, determine, from the stored ROA database, the first entry that matches the target origin AS number and the target route prefix, and then verify the BGP route information based on the first entry and the region identifier of the region to which the target route prefix actually belongs.

An implementation process in which the first network device verifies the target origin AS number includes the following. The first network device obtains, from the ROA database, an origin AS number corresponding to the target route prefix, and if the obtained origin AS number is the target origin AS number, determines that the verification of the target origin AS number succeeds, or if the obtained origin AS number is not the target origin AS number, determines that the verification of the target origin AS number fails.

An implementation process in which the first network device verifies the BGP route information based on the first entry and the region identifier of the region to which the target route prefix actually belongs includes the following. When a region identifier in the first entry is not empty, if the region identifier in the first entry is the same as or matches the region identifier of the region to which the target route prefix actually belongs, the first network device determines that the verification of the BGP route information succeeds. If the region identifier in the first entry is not the same as or does not match the region identifier of the region to which the target route prefix actually belongs, the first network device determines that the verification of the BGP route information fails. When a region identifier in the first entry is empty, the first network device determines that the region identifier in the first entry matches the region identifier of the region to which the target route prefix actually belongs, and determines that the verification of the BGP route information succeeds.

For some Ass, a route prefix of the AS may be applicable globally, or may be applicable to only a local region. In other words, the route prefix of the AS may be applicable to any region, or may be applicable to only a local region. When the route prefix of the AS is applicable to any region, a region identifier in a corresponding entry in the ROA database may be empty, or when the route prefix of the AS is applicable to any region, the region identifier in the corresponding entry in the ROA database may be not empty. This is, the region identifier in the corresponding entry in the ROA database may be empty or not empty.

Therefore, after the first entry is obtained through matching, when the region identifier in the first entry is not empty, it indicates that the route prefix of the AS is applicable to a local region. In this case, the region identifier in the first entry needs to be compared with the region identifier of the region to which the target route prefix actually belongs, to determine whether validity verification of the region to which the target route prefix belongs succeeds. When the region identifier in the first entry is empty, it indicates that the route prefix of the AS is applicable to any region. In this case, the first network device may directly determine that the region identifier in the first entry matches the region identifier of the region to which the target route prefix actually belongs, and determine that the verification of the BGP route information succeeds.

It is clear that, when the route prefix of the AS is applicable globally, the region identifier in the corresponding entry in the ROA database may alternatively be represented by using another identifier, for example, represented by using a specific identifier. In this case, when the route prefix of the AS is applicable to any region, the region identifier in the corresponding entry in the ROA database is not empty. In this way, after the first entry is obtained through matching, the first network device needs to determine whether the region identifier in the first entry is a specific identifier. If the region identifier in the first entry is not a specific identifier, it indicates that the route prefix of the AS is applicable to a local region. In this case, the region identifier in the first entry needs to be compared with the region identifier of the region to which the target route prefix actually belongs, to determine whether validity verification of the region to which the target route prefix belongs succeeds. If the region identifier in the first entry is a specific identifier, it indicates that the route prefix of the AS is applicable to any region. In this case, the first network device may directly determine that the region identifier in the first entry matches the region identifier of the region to which the target route prefix actually belongs, and determine that the verification of the BGP route information succeeds.

It should be noted that, that the route prefix is applicable to any region means that the route prefix may be used in any region, and that the route prefix is applicable to a local region means that the route prefix may be used in a local region.

In addition, when an entry in the ROA database stores an origin AS number, a route prefix, and a region identifier, formats of all entries in the ROA database may be shown in the following Table 1.

TABLE 1

| Origin AS number | Route prefix | Region identifier |
|---|---|---|
| 4807 | 5.10.136.0/24 | A |
| 4808 | 27.148.248.0/21 | B |
| 4809 | 66.102.240.0/24 | C |
| . . . | . . . | . . . |

It should be noted that the ROA database shown in Table 1 is merely an example. During actual application, the ROA database may further include other information. This is not limited in this embodiment of this application.

Stage of building an ROA database:

Optionally, before the first network device determines the first entry from the stored ROA database, an ROA database may further be built. The ROA database includes one or more entries, and each entry stores a correspondence between a route prefix and a region identifier. Alternatively, the ROA database stores a correspondence among an origin AS number, a route prefix, and a region identifier. The following also describes the two cases.

In a first case, by using the first entry as an example, an implementation process in which the first network device builds the ROA database includes the following. The first network device obtains the target route prefix and target region indication information from a server, where the target region indication information includes a region identifier or indication information indicating that the target route prefix is applicable to any region. The first network device creates the first entry in the ROA database based on the target route prefix and the target region indication information.

After obtaining the target route prefix and the target region indication information, the server sends the target route prefix and the target region indication information to the first network device. The first network device creates the first entry in the ROA database based on the target route prefix and the target region indication information.

The first network device may obtain the target route prefix and the target region indication information from the server in two implementations. In other words, the server may send the target route prefix and the target region indication information to the first network device in two implementations. The following describes the two implementations.

In a first implementation, the server sends a packet to the first network device, where the packet carries the target route prefix and the target region indication information. The first network device receives the packet from the server. In the first implementation, the server sends the target route prefix and the target region indication information to the first network device by using the packet. In this way, after receiving the packet, the first network device may directly store the target route prefix and the target region indication information in the ROA database.

In a second implementation, the server sends a packet to the first network device, where the packet carries the target route prefix. The first network device receives the packet from the server. The first network device sends a request message to the server, where the request message carries the target route prefix, and the request message requests to obtain region indication information corresponding to the target route prefix. After receiving the request message sent by the first network device, the server obtains, based on the target route prefix, the target region indication information from a stored correspondence between a route prefix and region indication information. The server sends the target region indication information to the first network device. The first network device receives the target region indication information sent by the server.

In a second case, by using the first entry as an example, an implementation process in which the first network device builds the ROA database includes the following. The first network device obtains the target origin AS number, the target route prefix, and target region indication information from a server, where the target region indication information includes a region identifier or indication information indicating that the target route prefix is applicable to any region. The first network device creates the first entry in the ROA database based on the target origin AS number, the target route prefix, and the target region indication information.

After obtaining the target origin AS number, the target route prefix, and the target region indication information, the server sends the target origin AS number, the target route prefix, and the target region indication information to the first network device. The first network device creates the first entry in the ROA database based on the target origin AS number, the target route prefix, and the target region indication information.

Based on the foregoing descriptions, route prefixes of some ASs may be applicable to any region or may be applicable to only a local region. Therefore, for the target route prefix, the target route prefix may be applicable to any region, or may be applicable to only a local region. In other words, the target region indication information may be indication information indicating that the target route prefix is applicable to any region, or may be a region identifier of a local region. The indication information indicating that the target route prefix is applicable to any region may be preset. This is not limited in this embodiment of this application.

In addition, the server may periodically and synchronously download information such as a resource certificate and an ROA signature from an RPKI database, to obtain origin AS numbers, route prefixes, and region indication information of all ASs. It is clear that, the server may alternatively obtain the origin AS numbers, the route prefixes, and the region indication information of all ASs in another manner. This is not limited in this embodiment of this application. In addition, the server may be an RPKI server, or may be another server. This is also not limited in this embodiment of this application.

The first network device may obtain the target origin AS number, the target route prefix, and the target region indication information from the server in two implementations. In other words, the server may send the target origin AS number, the target route prefix, and the target region indication information to the first network device in two implementations. The following describes the two implementations.

In a first implementation, the server sends a packet to the first network device, where the packet carries the target origin AS number, the target route prefix, and the target region indication information. The first network device receives the packet from the server. In the first implementation, the server sends the target origin AS number, the target route prefix, and the target region indication information to the first network device by using the packet. In this way, after receiving the packet, the first network device may directly store the target origin AS number, the target route prefix, and the target region indication information in the ROA database.

Figures 5, 6:
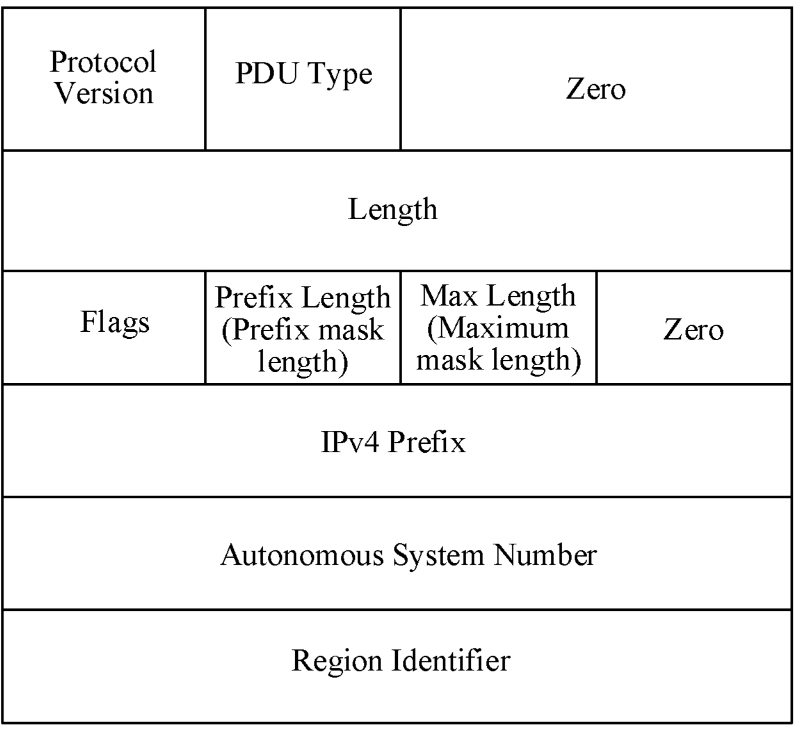
FIG. 5 is a schematic diagram of a structure of an IPv4 packet according to an embodiment of this application.
FIG. 6 is a schematic diagram of a structure of an IPv6 packet according to an embodiment of this application.

For the IPv4, a format of the packet may be shown in FIG. 5, and fields included in the packet are sequentially described as follows:

Protocol version: a version number of a communication protocol between the server and the network device, occupying 1 byte, where a current value of the byte is 2, and the value is incremented after a new field is added;

Protocol data unit (PDU) type: a type of the packet, occupying one byte, where a current value of the byte is 4, indicating that the packet is an IPv4 packet;

Zero: a padding field whose value is 0, occupying 2 bytes;

Length: indicating a length of the entire packet, which is fixed at 20 bytes;

Flags: 1 byte, set by bits, where bit 0 is currently used, and remaining seven bits are not used, a value of bit 0 may be 0 or 1, and when the value of bit 0 is 0, it indicates advertising the packet; or when the value of bit 0 is 1, it indicates canceling the packet;

Prefix length (or prefix mask length) occupying 1 byte;

Max length (or maximum mask length) occupying 1 byte;

Zero a padding field whose value is 0, occupying 1 byte;

IPv4 prefix occupying 4 bytes, where the field can carry the route prefix;

Autonomous system number occupying 4 bytes, where the field can carry the origin AS number; and Region identifier complying with the international code, where a length of the field is determined based on a coding format, and the field can carry the region indication information.

For the IPv6, a format of the packet may be shown in FIG. 6, and fields included in the packet are sequentially described as follows:

Protocol version: a version number of a communication protocol between the server and the network device, occupying 1 byte, where a current value of the byte is 2, and the value is incremented after a new field is added;

PDU type: a type of the packet, occupying one byte, where a current value of the byte is 6, indicating that the packet is an IPv6 packet;

Zero: a padding field whose value is 0, occupying 2 bytes;

Length: indicating a length of the entire packet, which is fixed at 32 bytes;

Flags: 1 byte, set by bits, where bit 0 is currently used, and remaining seven bits are not used, a value of bit 0 may be 0 or 1, and when the value of bit 0 is 0, it indicates advertising the packet; or when the value of bit 0 is 1, it indicates canceling the packet;

Prefix length (or prefix mask length): occupying 1 byte;

Max length (or maximum mask length): occupying 1 byte;

Zero: a padding field whose value is 0, occupying 1 byte;

IPv6 prefix: occupying 16 bytes, where the field can carry the route prefix;

Autonomous system number: occupying 4 bytes, where the field can carry the origin AS number; and Region identifier: complying with the international code, where a length of the field is determined based on a coding format, and the field can carry the region indication information.

It should be noted that the foregoing packet structure is merely an example. During actual application, the target origin AS number, the target route prefix, and the target region indication information may be sent to the first network device by using a packet of another structure. This is not limited in this embodiment of this application.

In a second implementation, the server sends a packet to the first network device, where the packet carries the target origin AS number and the target route prefix. The first network device receives the packet from the server. The first network device sends a request message to the server, where the request message carries the target route prefix, and the request message requests to obtain region indication information corresponding to the target route prefix. After receiving the request message sent by the first network device, the server obtains, based on the target route prefix, the target region indication information from a stored correspondence between a route prefix and region indication information.

The server sends the target region indication information to the first network device. The first network device receives the target region indication information sent by the server. In the second implementation, an existing packet format does not need to be modified, and the target origin AS number and the target route prefix are carried in a same packet in the existing packet format. In this way, after receiving the packet, the first network device may obtain the target region indication information from the server based on the target route prefix, to store the target origin AS number, the target route prefix, and the target region indication information in the ROA database.

Stage of processing the BGP route information:

Based on the foregoing descriptions, the BGP route information obtained by the first network device may be inbound BGP route information, or may be outbound BGP route information. When directions of the BGP route information are different, the BGP route information is processed in different manners based on verification results of the BGP routing information. The following provides descriptions based on different cases.

In a first case, the BGP route information is inbound BGP route information.

The BGP route information is BGP route information from a second network device. In other words, the BGP route information is route information from an external BGP peer, and the BGP route information corresponds to a first BGP route. In this way, the first network device may store the first BGP route when the verification of the BGP route information succeeds. When the verification of the BGP route information fails, the first network device discards the first BGP route, or when the verification of the BGP route information fails, the first network device sets a priority of the first BGP route to a low priority. For example, a priority of the first BGP route is set to a first priority, where the first priority is lower than a second priority, the second priority is a priority of a second BGP route, and a prefix of the second BGP route is the same as a prefix of the first BGP route. Optionally, a region to which the route prefix corresponding to the second BGP route belongs is the same as a region to which the second network device belongs.

After storing the first BGP route included in the BGP route information, the first network device may further learn the first BGP route.

Optionally, when the verification of the BGP route information fails, it indicates that the BGP route information may be hijacked route information. In other words, the BGP route information may be forged route information, and security is low. However, the second network device is an external BGP peer of the first network device, and the region to which the route prefix corresponding to the second BGP route belongs is the same as the region to which the second network device belongs, that is, the second BGP route is a route advertised by the second network device. Therefore, the priority of the first BGP route may be set to be lower than the priority of the second BGP route. In this way, in a process of delivering the BGP route to a forwarding table, the second BGP route with the higher priority may be selected and delivered to the forwarding table, so that user traffic is prevented from being eavesdropped on the premise that the user traffic can be forwarded under guidance.

It is clear that, when the verification of the BGP route information fails, the first BGP route included in the BGP route information is directly discarded. In this way, the first BGP route can be prohibited from being used on a network device, and the user traffic can also be prevented from being eavesdropped.

In a second case, the BGP route information is outbound BGP route information.

The BGP route information is BGP route information sent to a third network device. In other words, the BGP route information is route information sent to an internal BGP peer, and the BGP route information corresponds to a first BGP route. In this way, when the verification of the BGP route information succeeds, the first network device sends the BGP route information to the third network device, so that the third network device stores the first BGP route, and further forwards the packet by using the first BGP route.

Based on the foregoing descriptions, when receiving the inbound BGP route information, the first network device may not verify the BGP route information, but store the BGP route information. In other words, after verifying the inbound BGP route information, the first network device stores the BGP route information. That is, route information locally stored in the first network device may be verified, or may not be verified. Regardless of whether the route information locally stored in the first network device is verified, when it is determined that the verification of the BGP route information succeeds before the BGP route information is sent to the third network device, the BGP route information may be directly sent to the third network device.

However, when it is currently determined that the verification of the BGP route information fails, two cases need to be described separately. When the verification of the route information locally stored in the first network device succeeds, and before the BGP route information is sent to the third network device, if it is determined that the verification of the BGP route information fails, the first network device may determine, from the stored ROA database, a second entry that matches the target route prefix and the region identifier of the region to which the target route prefix actually belongs. The first network device modifies an origin AS number in the BGP route information to an origin AS number in the second entry. When the route information locally stored in the first network device is not verified, and before the BGP route information is sent to the third network device, if it is determined that the verification of the BGP route information fails, the first network device may discard the first BGP route included in the BGP route information, or set the priority of the first BGP route included in the BGP route information to the first priority.

It should be noted that, after the first network device locally stores the BGP route information, the origin AS number in the locally stored BGP route information may be incorrectly modified due to a routing policy or a software problem. Therefore, when the verification of the BGP route information fails, if the BGP route information is not verified before being locally stored in the first network device, it indicates that the origin AS number included in the BGP route information may be incorrectly modified due to the routing policy or the software problem of the first network device, or the BGP route information may be forged route information originally. For security, the first BGP route included in the BGP route information may be discarded, or the priority of the first BGP route included in the BGP route information may be set to a low priority.

However, if the BGP route information is verified before being locally stored in the first network device, and the verification succeeds, it indicates that the origin AS number included in the BGP route information is indeed incorrectly modified due to the routing policy or the software problem of the first network device. Therefore, the first network device may determine, from the stored ROA database, the second entry that matches the target route prefix and the region identifier of the region to which the target route prefix actually belongs, and further modify the origin AS number in the BGP route information to an origin AS number in the second entry. In this way, a problem of invalid BGP route information caused by incorrect modification of the origin AS number due to the routing policy or the software problem, and a problem of an Internet fault is avoided.

After the first network device sends the BGP route information to the third network device, the third network device may not only store the first BGP route included in the BGP route information, but also learn the first BGP route.

In conclusion, in this embodiment of this application, when validity verification of the BGP route information is performed, the region to which the route prefix belongs is considered. Therefore, when a plurality of route prefixes is distributed in different regions, the region to which the route prefix included in the BGP route information belongs is distinguished by using region identifiers of regions to which the route prefixes belong, to verify whether the BGP route information is valid, so that network security and accuracy of route source verification are improved. That is, by verifying the region to which the route prefix belongs, it can be further detected whether the BGP route information is hijacked, so that a source hijacking attack initiated by an attacker can be effectively identified, to block a vulnerability caused by the attack initiated by the attacker.

Figure 7:
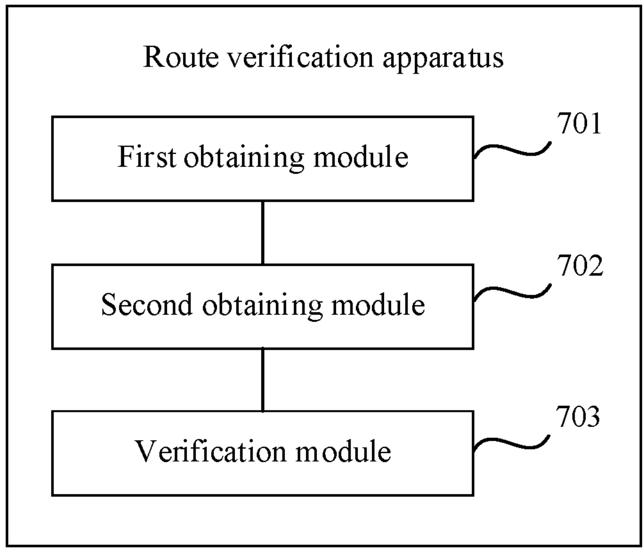
FIG. 7 is a schematic diagram of a structure of a route verification apparatus according to an embodiment of this application.

FIG. 7 is a schematic diagram of a structure of a route verification apparatus according to an embodiment of this application. The route verification apparatus may be implemented as a part or all of a network device by using software, hardware, or a combination thereof. The network device may be the first network device shown in FIG. 2 or FIG. 3, and is configured to implement a function of the first network device shown in FIG. 2 or FIG. 3. Refer to FIG. 7. The apparatus includes a first obtaining module 701, a second obtaining module 702, and a verification module 703.

The first obtaining module 701 is configured to obtain BGP route information, where the BGP route information includes a target route prefix. For a detailed implementation process, refer to corresponding steps in the foregoing embodiment.

The second obtaining module 702 is configured to obtain, based on the target route prefix, a region identifier of a region to which the target route prefix actually belongs. For a detailed implementation process, refer to corresponding steps in the foregoing embodiment.

The verification module 703 is configured to verify the BGP route information based on the target route prefix and the region identifier of the region to which the target route prefix actually belongs. For a detailed implementation process, refer to corresponding steps in the foregoing embodiment.

Optionally, the verification module 703 includes a determining submodule configured to determine a first entry from a stored ROA database, and a verification submodule configured to verify the BGP route information based on the first entry and the region identifier of the region to which the target route prefix actually belongs.

Optionally, the determining submodule is further configured to determine, from the ROA database, a first entry that matches the target route prefix, where the ROA database stores a correspondence between a route prefix and a region identifier.

Optionally, the BGP route information further includes a target origin AS number.

The determining submodule is further configured to determine, from the stored ROA database, a first entry that matches the target origin AS number and the target route prefix, where the ROA database stores a correspondence among an origin AS number, a route prefix, and a region identifier.

Optionally, the verification submodule is further configured to, when a region identifier in the first entry is not empty, if the region identifier in the first entry is the same as the region identifier of the region to which the target route prefix actually belongs, determine that the verification of the BGP route information succeeds.

Optionally, the verification submodule is further configured to, when a region identifier in the first entry is not empty, if the region identifier in the first entry is a specific identifier, determine that the verification of the BGP route information succeeds.

Optionally, the verification submodule is further configured to, when a region identifier in the first entry is empty, determine that the verification of the BGP route information succeeds.

Optionally, the verification module 703 further includes a first obtaining submodule configured to obtain the target route prefix and target region indication information from a server, where the target region indication information includes a region identifier or indication information indicating that the target route prefix is applicable to any region, and a first creation submodule configured to create the first entry in the ROA database based on the target route prefix and the target region indication information.

Optionally, the first obtaining submodule is further configured to receive a packet from the server, where the packet carries the target route prefix and the target region indication information.

Optionally, the first obtaining submodule is further configured to receive a packet from the server, where the packet carries the target route prefix, send a request message to the server, where the request message carries the target route prefix, and receive the target region indication information sent by the server.

Optionally, the verification module 703 further includes a second obtaining submodule configured to obtain the target origin AS number, the target route prefix, and target region indication information from a server, where the target region indication information includes a region identifier or indication information indicating that the target route prefix is applicable to any region, and a second creation submodule configured to create the first entry in the ROA database based on the target origin AS number, the target route prefix, and the target region indication information.

Optionally, the second obtaining submodule is further configured to receive, a packet from the server, where the packet carries the target origin AS number, the target route prefix, and the target region indication information.

Optionally, the second obtaining submodule is further configured to receive a packet from the server, where the packet carries the target origin AS number and the target route prefix, send a request message to the server, where the request message carries the target route prefix, and receive the target region indication information sent by the server.

Optionally, the server is an RPKI server.

Optionally, the second obtaining module 702 is further configured to determine a region identifier of a region to which a starting network device in a plurality of network devices through which the target route prefix actually passes belongs, to obtain the region identifier of the region to which the target route prefix actually belongs.

Optionally, the first obtaining module 701 is further configured to receive the BGP route information from a second network device, where the BGP route information corresponds to a first BGP route.

The apparatus further includes a storage module configured to store the first BGP route when the verification of the BGP route information succeeds.

Optionally, the apparatus further includes a processing module configured to, when the verification of the BGP route information fails, discard the first BGP route, or set a priority of the first BGP route to a first priority, where the first priority is lower than a second priority, the second priority is a priority of a second BGP route, and a route prefix corresponding to the second BGP route is the same as a route prefix corresponding to the first BGP route.

Optionally, the first obtaining module 701 is further configured to obtain the BGP route information from locally stored route information, where the verification of the BGP route information succeeds before being locally stored in the first network device, and the BGP route information corresponds to a first BGP route.

The apparatus further includes a sending module configured to, when the verification of the BGP route information succeeds, send the BGP route information to a third network device, so that the third network device stores the first BGP route.

Optionally, the apparatus further includes a determining module configured to, when the verification of the BGP route information fails, determine, from the stored ROA database, a second entry that matches the target route prefix and the region identifier of the region to which the target route prefix actually belongs, and a modification module configured to modify an origin AS number included in the BGP route information to an origin AS number in the second entry.

In conclusion, in this embodiment of this application, when validity verification of the BGP route information is performed, the region to which the route prefix belongs is considered. Therefore, when a plurality of route prefixes is distributed in different regions, the region to which the route prefix included in the BGP route information belongs is distinguished by using region identifiers of regions to which the route prefixes belong, to verify whether the BGP route information is valid, so that network security and accuracy of route source verification are improved. That is, by verifying the region to which the route prefix belongs, it can be further detected whether the BGP route information is hijacked, so that a source hijacking attack initiated by an attacker can be effectively identified, to block a vulnerability caused by the attack initiated by the attacker.

It should be noted that, when the route verification apparatus provided in the foregoing embodiment performs route verification, division into the functional modules is only used as an example for description. During actual application, the functions may be allocated to different functional modules for implementation based on a requirement. That is, an inner structure of the apparatus is divided into different functional modules to implement all or some of the functions described above. In addition, the embodiments of the route verification apparatus and the route verification method provided in the foregoing embodiments pertain to a same concept. For a specific implementation process, refer to the method embodiments. Details are not described herein again.

Figure 8:
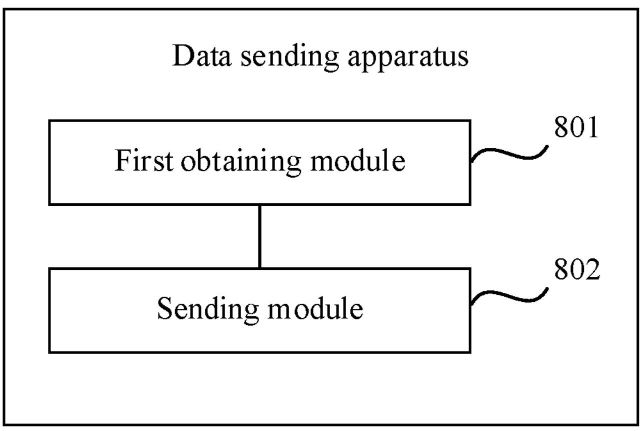
FIG. 8 is a schematic diagram of a structure of a data sending apparatus according to an embodiment of this application.

FIG. 8 is a schematic diagram of a structure of a data sending apparatus according to an embodiment of this application. The data sending apparatus may be implemented as a part or all of a server by using software, hardware, or a combination thereof. The server may be the server shown in FIG. 2 or FIG. 3, and is configured to implement a function of the server shown in FIG. 2 or FIG. 3. Refer to FIG. 8. The apparatus includes a first obtaining module 801 and a sending module 802.

The first obtaining module 801 is configured to obtain a target route prefix and target region indication information, where the target region indication information includes a region identifier or indication information indicating that the target route prefix is applicable to any region.

The sending module 802 is configured to send the target route prefix and the target region indication information to a first network device, where the first network device is any network device in a network based on a BGP.

Optionally, the sending module 802 is further configured to send a packet to the first network device, where the packet carries the target route prefix and the target region indication information.

Optionally, the sending module 802 is further configured to send a packet to the first network device, where the packet carries the target route prefix, receive a request message sent by the first network device, where the request message carries the target route prefix, obtain, based on the target route prefix, the target region indication information from a stored correspondence between a route prefix and region indication information, and send the target region indication information to the first network device.

Optionally, the apparatus further includes a second obtaining module configured to obtain a target origin AS number.

The sending module 802 is further configured to send the target origin AS number, the target route prefix, and the target region indication information to the first network device.

Optionally, the sending module 802 is further configured to send a packet to the first network device, where the packet carries the target origin AS number, the target route prefix, and the target region indication information.

Optionally, the sending module 802 is further configured to send a packet to the first network device, where the packet carries the target origin AS number and the target route prefix, receive a request message sent by the first network device, where the request message carries the target route prefix, obtain, based on the target route prefix, the target region indication information from a stored correspondence between a route prefix and region indication information, and send the target region indication information to the first network device.

Optionally, the server is an RPKI server.

In conclusion, in this embodiment of this application, the server sends the origin AS number, the route prefix, and the region indication information to the first network device, and the first network device builds the ROA database. In this way, when performing validity verification on the BGP route information, the first network device may distinguish, based on the ROA database, the region to which the route prefix included in the BGP route information belongs, so that when a plurality of route prefixes is distributed in different regions, whether the BGP route information is valid can be verified, and network security and accuracy of route source verification are improved. That is, by verifying the region to which the route prefix belongs, it can be further detected whether the BGP route information is hijacked, so that a source hijacking attack initiated by an attacker can be effectively identified, to block a vulnerability caused by the attack initiated by the attacker.

It should be noted that, when the data sending apparatus provided in the foregoing embodiment sends data, division into the functional modules is only used as an example for description. During actual application, the functions may be allocated to different functional modules for implementation based on a requirement. That is, an inner structure of the apparatus is divided into different functional modules to implement all or some of the functions described above. In addition, the embodiments of the data sending apparatus and the data sending method provided in the foregoing embodiments pertain to a same concept. For a specific implementation process, refer to the method embodiments. Details are not described herein again.

Figure 9:
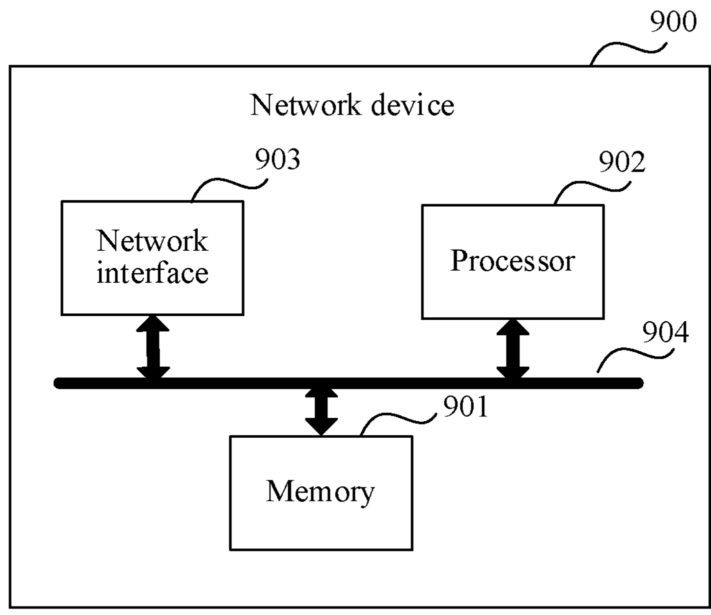
FIG. 9 is a schematic diagram of a structure of a network device according to an embodiment of this application.

FIG. 9 is another possible schematic diagram of a structure of a network device in the foregoing embodiments. The network device 900 includes a processor 902, a network interface 903, a memory 901, and a bus 904.

The memory 901 is configured to store instructions. When the embodiment shown in FIG. 4 is implemented, and units described in the embodiment in FIG. 4 are implemented by using software, software or program code needed for performing functions of the units in FIG. 4 is stored in the memory 901.

The processor 902 is configured to execute the instructions in the memory 901, and perform the route verification method applied to the embodiment shown in FIG. 4. The processor 902 may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processor 902 may implement or execute various example logical blocks, modules, and circuits described with reference to content disclosed in embodiments of this application. Alternatively, the processor may be a combination of processors implementing a computing function, for example, a combination of one or more microprocessors, or a combination of a DSP and a microprocessor.

The network interface 903 is configured to communicate with another network device. The network interface 903 may be an Ethernet interface, an asynchronous transfer mode (ATM) interface, or the like.

The network interface 903, the processor 902, and the memory 901 are connected to each other through the bus 904. The bus 904 may be a Peripheral Component Interconnect (PCI) bus, an Extended Industry Standard Architecture (EISA) bus, or the like. The bus may be classified into an address bus, a data bus, a control bus, and the like. For ease of representation, only one bold line is used to represent the bus in FIG. 9, but this does not mean that there is only one bus or only one type of bus.

In a specific embodiment, the processor 902 is configured to execute the instructions in the memory 901, so that the network device 900 obtains BGP route information, where the BGP route information includes a target route prefix, the network device 900 obtains, based on the target route prefix, a region identifier of a region to which the target route prefix actually belongs, and the first network device verifies the BGP route information based on the target route prefix and the region identifier of the region to which the target route prefix actually belongs. For a detailed processing process of the processor 902, refer to the detailed descriptions in the embodiment shown in FIG. 4. Details are not described herein again.

The network interface 903 is used by the network device 900 to receive the BGP route information and receive and send the packet. For a specific process, refer to the detailed descriptions in the embodiment shown in FIG. 4. Details are not described herein again.

Figure 10:
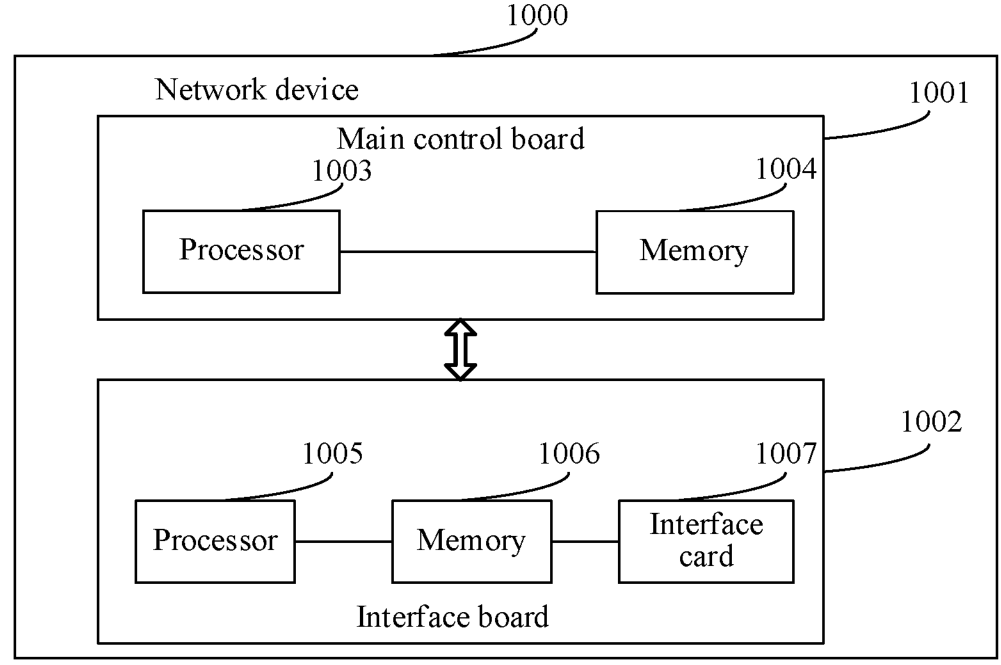
FIG. 10 is a schematic diagram of a structure of another network device according to an embodiment of this application.

FIG. 10 is another possible schematic diagram of a structure of a network device in the foregoing embodiments. The network device 1000 includes a main control board 1001 and an interface board 1002. The main control board 1001 includes a processor 1003 and a memory 1004. The interface board 1002 includes a processor 1005, a memory 1006, and an interface card 1007. The main control board 1001 is coupled to the interface board 1002.

The hardware may implement corresponding functions of the network device in the embodiment shown in FIG. 4. For example, the memory 1006 is configured to store program code of the interface board 1002, and the processor 1005 is configured to invoke the program code in the memory 1006 to trigger the interface card 1007 to perform various information receiving and sending performed by the network device in the foregoing method embodiments. The memory 1004 may be configured to store program code of the main control board 1001, and the processor 1003 is configured to invoke the program code in the memory 1004 to perform other processing of the network device in the foregoing method embodiments except information receiving and sending.

For example, the processor 1005 is configured to trigger the interface card 1007 to obtain BGP route information, where the BGP route information includes a target route prefix, the network device obtains, based on the target route prefix, a region identifier of a region to which the target route prefix actually belongs, and the network device verifies the BGP route information based on the target route prefix and the region identifier of the region to which the target route prefix actually belongs. The memory 1004 is configured to store program code and data of the main control board 1001, and the memory 1006 is configured to store program code and data of the interface board 1002.

In an example, an inter-process communication (IPC) channel is established between the main control board 1001 and the interface board 1002, and the main control board 1001 and the interface board 1002 communicate with each other through the IPC channel. For example, the main control board 1001 receives the BGP route information or the packet from the interface board 1002 through the IPC channel.

The network device 1000 may be a router, a switch, or a network device having a forwarding function. The network device 1000 may implement functions of the network device in the embodiment shown in FIG. 4. For specific execution steps, refer to the foregoing method embodiments. Details are not described herein again.

An embodiment of this application further provides a non-transient storage medium configured to store software instructions used in the foregoing embodiments. The software instructions include a program configured to perform the method shown in the foregoing embodiments. When the program is executed on a computer or a network device, the computer or the network device is enabled to perform the method in the foregoing method embodiments.

An embodiment of this application further provides a computer program product including computer program instructions. When the computer program product runs on a network node, the network node is enabled to perform the method in the foregoing method embodiments.

All or some of the foregoing embodiments may be implemented by using software, hardware, firmware, or any combination thereof. When software is used to implement the technical solutions, all or a part of the technical solutions may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid state drive (SSD)), or the like. It should be noted that the computer-readable storage medium in embodiments of this application may be a non-volatile storage medium. In other words, the computer-readable storage medium may be a non-transitory storage medium.

It should be understood that "a plurality of" in this specification means two or more. In the descriptions in embodiments of this application, "/" means "or" unless otherwise specified. For example, A/B may represent A or B. In the specification, "and/or" describes only an association relationship for describing associated objects and may represent that three relationships may exist. For example, A and/or B may represent the following three cases: only A exists, both A and B exist, and only B exists. In addition, to clearly describe the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

The foregoing descriptions are embodiments provided in this application, but are not used to limit this application. Any modification, equivalent replacement, or improvement made may fall within the protection scope of this application.

What is claimed is:

1. A method implemented by processing circuitry and comprising:
- obtaining a stored route origin authorization (ROA) database comprising a correspondence between a target route prefix and a first region identifier;
- obtaining Border Gateway Protocol (BGP) route information comprising the target route prefix, wherein the target route prefix is a prefix of a network address;
- obtaining, based on the target route prefix, the first region identifier of a region to which the target route prefix belongs by:
  - detecting network devices through which the target route prefix passes to obtain a subset of the network devices;
  - performing traceroute on the target route prefix to identify the subset of the network devices;
  - determining a region identifier of a region that a starting network device in the subset of the network devices belongs and that the target route prefix passes through; and
  - setting the region identifier of the starting network device as the first region identifier; and
- verifying, based on the target route prefix and the first region identifier, the BGP route information by:
  - determining, from the ROA database, a first entry matching the target route prefix; and
  - verifying, based on the first entry, the BGP route information.

2. The method of claim 1, wherein the BGP route information further comprises a target origin autonomous system (AS) number, wherein determining the first entry comprises determining, from the ROA database, the first entry matching the target origin AS number and the target route prefix, and wherein the method further comprises storing a correspondence among the target origin AS number, the target route prefix, and the first region identifier in the ROA database.

3. The method of claim 2, wherein before determining the first entry, the method further comprises:
- obtaining, from a server, the target origin AS number, the target route prefix, and target region indication information, wherein the target region indication information comprises the first region identifier or indication information indicating that the target route prefix is applicable to any region; and
- creating, based on the target origin AS number, the target route prefix, and the target region indication information, the first entry in the ROA database.

4. The method of claim 1, wherein verifying, the BGP route information comprises:
- identifying that a second region identifier in the first entry is not empty and that the second region identifier is the same as the first region identifier to which the target route prefix belongs; and
- determining, in response to identifying that the second region identifier is not empty and that the second region identifier is the same as the first region identifier, that a verification of the BGP route information has succeeded.

5. The method of claim 1, wherein verifying the BGP route information comprises:
- identifying that a second region identifier in the first entry is not empty and that the second region identifier is a specific identifier; and
- determining, in response to identifying that the second region identifier is not empty and that the second region identifier is the specific identifier, that a verification of the BGP route information has succeeded.

6. The method of claim 1, wherein verifying the BGP route information comprises:
- identifying that a second region identifier in the first entry is empty; and
- determining, in response to identifying that the second region identifier is empty, and that a verification of the BGP route information has succeeded.

7. The method of claim 1, wherein before determining the first entry, the method further comprises:

obtaining, from a server, the target route prefix and target region indication information, wherein the target region indication information comprises the first region identifier or indication information indicating that the target route prefix is applicable to any region; and creating, based on the target route prefix and the target region indication information, the first entry in the ROA database.

8. The method of claim 7, wherein obtaining, the target route prefix and the target region indication information comprises receiving, from the server, a packet carrying the target route prefix and the target region indication information.

9. The method of claim 7, wherein obtaining, the target route prefix and the target region indication information comprises:

receiving, from the server, a packet carrying the target route prefix;

sending, to the server, a request message carrying the target route prefix; and receiving, from the server in response to the request message, the target region indication information.

10. A method implemented by a server comprising processing circuitry, wherein the method comprises:

obtaining a target route prefix and target region indication information, wherein the target region indication information comprises a region identifier or indication information indicating that the target route prefix is applicable to any region, and wherein the target region indication information is obtained by traceroute on the target route prefix; and sending, to a network device, the target route prefix and the target region indication information for storage in a route origin authorization (ROA) database and to permit the network device to:

detect network devices through which the target route prefix passes to obtain a subset of the network devices;

perform traceroute on the target route prefix to identify the subset of the network devices;

determine a region identifier of a region that a starting network device in the subset of the network devices belongs and that the target route prefix passes through; and set the region identifier of the starting network device as a first region identifier; and verifying a Border Gateway Protocol (BGP) route information, wherein the target route prefix is a prefix of a network address, wherein the ROA database comprises a correspondence between the target route prefix and the first region identifier, and wherein the network device is in a network that is based on BGP.

11. The method of claim 10, wherein sending the target route prefix and the target region indication information comprises sending, to the network device, a packet carrying the target route prefix and the target region indication information.

12. The method of claim 10, wherein sending the target route prefix and the target region indication information comprises:

sending, to the network device, a packet carrying the target route prefix;

receiving, from the network device, a request message carrying the target route prefix;

obtaining, based on the target route prefix, the target region indication information from a stored correspondence between the target route prefix and the target region indication information; and sending, to the network device in response to the request message, the target region indication information.

13. An apparatus comprising:

at least one memory configured to store instructions; and at least one processor coupled to the at least one memory and configured to execute the instructions to cause the apparatus to:

obtain a stored route origin authorization (ROA) database comprising a correspondence between a target route prefix and a first region identifier;

obtain Border Gateway Protocol (BGP) route information comprising the target route prefix, wherein the target route prefix is a prefix of a network address;

obtain, based on the target route prefix, a region identifier of a region to which the target route prefix belongs by:

detecting network devices through which the target route prefix passes to obtain a subset of the network devices;

performing traceroute on the target route prefix to identify the subset of the network devices;

determining a region identifier of a region that a starting network device in the subset of the network devices belongs and that the target route prefix passes through; and setting the region identifier of the starting network device as the first region identifier; and verify, based on the target route prefix and the region identifier, the BGP route information by:

determining, from the stored route origin authorization (ROA) database, a first entry matching the target route prefix; and verifying, based on the first entry, the BGP route information.

14. The apparatus of claim 13, wherein the BGP route information further comprises a target origin autonomous system (AS) number, and wherein the at least one processor is further configured to execute the instructions to cause the apparatus to:

determine the first entry by determining, from the ROA database, the first entry matching the target origin AS number and the target route prefix; and store a correspondence among the target origin AS number, the target route prefix, and the first region identifier in the ROA database.

15. The apparatus of claim 14, wherein before determining the first entry, the at least one processor is further configured to execute the instructions to cause the apparatus to:

obtain, from a server, the target origin AS number, the target route prefix, and target region indication information, wherein the target region indication information comprises the first region identifier or indication information indicating that the target route prefix is applicable to any region; and create, based on the target origin AS number, the target route prefix, and the target region indication information, the first entry in the ROA database.

16. The apparatus of claim 14, wherein the at least one processor is further configured to execute the instructions to cause the apparatus to verify the BGP route information by:

identifying that a second region identifier in the first entry is not empty and that the second region identifier is the same as the first region identifier to which the target route prefix belongs; and determining, in response to identifying that the second region identifier is not empty and that the second region identifier is the same as the first region identifier, that a verification of the BGP route information has succeeded.

17. The apparatus of claim 14, wherein the at least one processor is further configured to execute the instructions to cause the apparatus to verify the BGP route information by:

identifying that a second region identifier in the first entry is not empty and that the second region identifier is a specific identifier; and determining, in response to identifying that the second region identifier is not empty and that the second region identifier is the specific identifier, that a verification of the BGP route information has succeeded.

18. An apparatus comprising:

at least one memory configured to store instructions; and at least one processor coupled to the at least one memory and configured to execute the instructions to cause the apparatus to:

obtain a target route prefix and target region indication information, wherein the target region indication information comprises a region identifier or indication information indicating that the target route prefix is applicable to any region, and wherein the target region indication information is obtained by traceroute on the target route prefix; and send, to a network device, the target route prefix and the target region indication information for storage in a route origin authorization (ROA) database and to permit the network device to:

detect network devices through which the target route prefix passes to obtain a subset of the network devices;

perform traceroute on the target route prefix to identify the subset of the network devices;

determine a region identifier of a region that a starting network device in the subset of the network devices belongs and that the target route prefix passes through; and set the region identifier of the starting network device as a first region identifier; and verify a Border Gateway Protocol (BGP) route information, wherein the target route prefix is a prefix of a network address, wherein the ROA database comprises a correspondence between the target route prefix and the first region identifier, and wherein the network device is any network device in a network based on BGP.

19. The apparatus of claim 18, wherein the at least one processor is further configured to execute the instructions to cause the apparatus to send, to the network device, a packet carrying the target route prefix and the target region indication information.

20. The apparatus of claim 18, wherein the at least one processor is further configured to execute the instructions to cause the apparatus to:

send, to the network device, a packet carrying the target route prefix;

receive, from the network device, a request message carrying the target route prefix;

obtain, based on the target route prefix, the target region indication information from a stored correspondence between the target route prefix and the target region indication information; and send, to the network device, the target region indication information.

* * * * *